(12) United States Patent
Allard et al.

(10) Patent No.: US 11,397,044 B2
(45) Date of Patent: Jul. 26, 2022

(54) METHOD OF MAKING A VACUUM INSULATED CABINET FOR A REFRIGERATOR

(71) Applicant: WHIRLPOOL CORPORATION, Benton Harbor, MI (US)

(72) Inventors: Paul B. Allard, Coloma, MI (US); Tao Liu, St. Joseph, MI (US); Hua Liu, St. Joseph, MI (US); Abhay Naik, Stevensville, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 105 days.

(21) Appl. No.: 16/637,826

(22) PCT Filed: Dec. 18, 2017

(86) PCT No.: PCT/US2017/067022
§ 371 (c)(1),
(2) Date: Feb. 10, 2020

(87) PCT Pub. No.: WO2019/125372
PCT Pub. Date: Jun. 27, 2019

(65) Prior Publication Data
US 2020/0173711 A1 Jun. 4, 2020

(51) Int. Cl.
*F25D 23/06* (2006.01)
*F16L 59/065* (2006.01)
*B29L 31/00* (2006.01)

(52) U.S. Cl.
CPC .......... *F25D 23/062* (2013.01); *F16L 59/065* (2013.01); *B29L 2031/7622* (2013.01);
(Continued)

(58) Field of Classification Search
CPC ...... F25D 23/06; F25D 23/062; F25D 23/063; F25D 23/065; F25D 23/066;
(Continued)

(56) References Cited

U.S. PATENT DOCUMENTS 1,372,859 A * 3/1921 Bardush ................ F25D 23/066
220/592.02
2,002,366 A 6/1933 Eto
(Continued)

FOREIGN PATENT DOCUMENTS

| CN | 102455105 A | 5/2012 |
| CN | 104929254 A | 9/2015 |

(Continued)

OTHER PUBLICATIONS

Federal Institute of Industrial Property; International Search Report; dated Aug. 10, 2018.
(Continued)

*Primary Examiner* — Andrew M Roersma
(74) *Attorney, Agent, or Firm* — Price Heneveld LLP

(57) ABSTRACT

A method of making an insulated cabinet for a refrigerator comprises: welding sheet metal to form an external wrapper, the external wrapper including an interior and welded areas with an outboard-facing side; welding sheet metal to form a first liner configured to be disposed within the interior of the external wrapper, the first liner including welded areas with an inboard-facing side; applying an adhesive to the outboard-facing side of the welded areas of the external wrapper; applying an adhesive to the inboard-facing side of the welded areas of the first liner; and disposing the first liner within the interior of the external wrapper, leaving a space between the first liner and the external wrapper.

20 Claims, 12 Drawing Sheets

(52) U.S. Cl.
CPC ........ *F25D 23/066* (2013.01); *F25D 2201/14* (2013.01); *F25D 2500/02* (2013.01)

(58) Field of Classification Search
CPC ................ F25D 2201/14; F25D 2500/02; F16L 59/065; B29L 2031/7622
See application file for complete search history.

(56) References Cited

U.S. PATENT DOCUMENTS

| | | | |
|---|---|---|---|
| 2,179,542 A | | 11/1939 | Claxton et al. |
| 3,409,976 A | * | 11/1968 | Kesling ................. F25D 23/066 228/170 |
| 4,080,021 A | * | 3/1978 | Pringle ................. F25D 23/066 312/406.2 |
| 6,305,768 B1 | * | 10/2001 | Nishimoto .......... B29C 44/1242 220/592.09 |
| 6,488,172 B1 | * | 12/2002 | Wenning ............... F25D 23/062 220/592.02 |
| 7,278,279 B2 | * | 10/2007 | Hirai ..................... F25D 23/062 312/401 |
| 7,993,723 B2 | * | 8/2011 | Jung ..................... F25D 23/065 428/69 |
| 9,139,756 B2 | | 9/2015 | Campbell |
| 9,170,046 B2 | * | 10/2015 | Jung ..................... F25D 23/066 |
| 9,441,779 B1 | | 9/2016 | Alshourbagy et al. |
| 2007/0277923 A1 | | 12/2007 | Wood et al. |
| 2009/0126765 A1 | | 5/2009 | Buehlmeyer et al. |
| 2011/0039108 A1 | | 2/2011 | Goeb et al. |
| 2015/0176888 A1 | | 6/2015 | Cur et al. |
| 2017/0184339 A1 | | 6/2017 | Liu et al. |
| 2017/0325634 A1 | * | 11/2017 | Cai ........................ A47J 41/022 |

FOREIGN PATENT DOCUMENTS

| | | | | |
|---|---|---|---|---|
| EP | 1338854 A1 | * | 8/2003 | ........... F25D 23/063 |
| JP | 2008190815 A | | 8/2008 | |
| JP | 2015197110 A | | 11/2015 | |

OTHER PUBLICATIONS

Xiao Jun, Application Of Adhesive Technology In Modern Bus Manufacturing, Bus Technology and Research, Issue 5, 2006, pp. 51-56.

Yang, Shuli et al., Application Series Sealing Paste/Sealing Adhesive Preparation and Formula Design, China Petrochemical Press, Apr. 2004, pp. 2-4.

Zhangzhou Soumu, Milk Production and Application Technology Market, 2006, 4 pages.

\* cited by examiner

METHOD OF MAKING A VACUUM INSULATED CABINET FOR A REFRIGERATOR

CROSS-REFERENCE TO RELATED APPLICATIONS

This application is a National Stage Application under 35 U.S.C. § 371 of International Application No. PCT/US2017/067022, filed on Dec. 18, 2017, entitled "METHOD OF MAKING A VACUUM INSULATED CABINET FOR A REFRIGERATOR," the entire disclosure of which is hereby incorporated herein by reference.

BACKGROUND OF THE DISCLOSURE

The present disclosure generally relates to a vacuum insulated cabinet for an appliance, such as a refrigerator, constructed with sheet metal. Sheet metal heretofore could not be utilized to form components utilized in a vacuum insulated refrigerator, without imposing fabrication limitations and accepting manufacturing defects. Joining edges of sheet metal typically requires welding, and the welded areas of the sheet metal are too porous (because of either micropores in the welded areas or lack of continuity of the weld or both) to maintain vacuum insulation. In other words, the lowered pressure of the vacuum insulation on one side of the welded areas causes air to leak through the pores of the welded areas until pressure on both sides of the welded areas is equalized, ruining the purpose of vacuum insulation.

SUMMARY OF THE INVENTION

In one aspect of the present disclosure, a method of making an insulated cabinet for a refrigerator comprises: welding sheet metal to form an external wrapper, the external wrapper including an interior and welded areas with an outboard-facing side; welding sheet metal to form a first liner configured to be disposed within the interior of the external wrapper, the first liner including welded areas with an inboard-facing side; applying an adhesive to the outboard-facing side of the welded areas of the external wrapper; applying an adhesive to the inboard-facing side of the welded areas of the first liner; and disposing the first liner within the interior of the external wrapper, leaving a space between the first liner and the external wrapper. The method can further comprise: welding sheet metal together to form a second liner configured to be disposed within the interior of the external wrapper, the second liner including welded areas with an inboard-facing side; applying an adhesive to the inboard-facing side of the welded areas of the second liner; and disposing the second liner within the interior of the external wrapper, leaving a space between the second liner and the external wrapper, and a space between the second liner and the first liner. The adhesive applied to the outboard-facing side of the welded areas of the external wrapper can be applied in one layer. The adhesive applied to the inboard-facing side of the welded areas of the first liner can be applied in one layer. The adhesive applied to the inboard-facing side of the welded areas of the second liner can be applied in one layer. The method can further comprise: applying a second adhesive, different than the first adhesive, to the outboard-facing side of the welded areas of the external wrapper over the first adhesive; applying a second adhesive, different than the first adhesive, to the inboard-facing side of the welded areas of the first liner over the first adhesive; and, if a second liner is utilized, applying a second adhesive, different than the first adhesive, to the inboard-facing side of the welded areas of the second liner over the first adhesive. The adhesive can be applied to the outboard-facing side of the welded areas of the external wrapper with a thickness of between 0.05 inches and 1.5 inches. The adhesive can be applied to the inboard-facing side of the welded areas of the first liner with a thickness of between 0.05 inches and 1.5 inches. The adhesive can be applied to the inboard-facing side of the welded areas of the second liner with a thickness of between 0.05 inches and 1.5 inches. The adhesive applied to the outboard-facing side of the welded areas of the external wrapper can be one or more of: a silicone adhesive, a polyurethane adhesive, an epoxy adhesive, or an acrylic adhesive. The adhesive applied to the inboard-facing side of the welded areas of the first liner can be one or more of: a silicone adhesive, a polyurethane adhesive, an epoxy adhesive, or an acrylic adhesive. The adhesive applied to the inboard-facing side of the welded areas of the second liner can be one or more of: a silicone adhesive, a polyurethane adhesive, an epoxy adhesive, or an acrylic adhesive.

In another aspect of the present disclosure, a vacuum insulated cabinet for a refrigerator comprises: an external wrapper forming an interior, the external wrapper comprising sheet metal including welded areas, the welded areas having an outboard-facing side, and an adhesive covering the outboard-facing side of the welded areas; a first liner disposed within the interior of the external wrapper, the first liner comprising sheet metal including welded edges, the welded edges having an inboard-facing side, and an adhesive covering the inboard-facing side of the welded edge; a space between the first liner and the external wrapper; and a vacuum insulated core disposed within in the space. The vacuum insulated refrigerator cabinet can further comprise: a second liner disposed in the interior of the external wrapper, the second liner comprising sheet metal including welded edges, the welded edges having an inboard-facing side, and an adhesive covering the inboard-facing side of the welded edge; wherein, the space is additionally between the second liner and the external wrapper, and between the first liner and the second liner. The adhesive covering the outboard-facing side of the welded areas of the external wrapper can be one layer. The adhesive covering the inboard-facing side of the welded areas of the first liner can be one layer. The adhesive covering the inboard-facing side of the welded areas of the second liner can be one layer. The external wrapper can further include a second adhesive covering the adhesive covering the outboard-facing side of the welded areas. The first liner can further include a second adhesive covering the adhesive covering the inboard-facing side of the welded areas. The second liner can further include a second adhesive covering the adhesive covering the inboard-facing side of the welded areas. The second adhesive and the adhesive of the external wrapper can be different. The second adhesive and the adhesive of the first liner can be different. The second adhesive and the adhesive of the second liner can be different. The adhesive covering the outboard-facing side of the welded areas of the external wrapper can have a thickness of between 0.05 inches and 1.5 inches. The adhesive covering to the inboard-facing side of the welded areas of the first liner can have a thickness of between 0.05 inches and 1.5 inches. The adhesive covering the inboard-facing side of the welded areas of the second liner can have a thickness of between 0.05 inches and 1.5 inches. The adhesive covering the outboard-facing side of the welded areas of the external wrapper can be one or more of: a silicone adhesive, a polyurethane adhesive, an epoxy adhesive, or an acrylic adhesive. The adhesive covering the inboard-facing side of the welded areas of the first liner can be one or more of: a silicone adhesive, a polyurethane adhesive, an epoxy adhesive, or an acrylic adhesive. The adhesive covering the inboard-facing side of the welded areas of the second liner can be one or more of: a silicone adhesive, a polyurethane adhesive, an epoxy adhesive, or an acrylic adhesive.

These and other features, advantages, and objects of the present disclosure will be further understood and appreciated by those skilled in the art by reference to the following specification, claims, and appended drawings.

BRIEF DESCRIPTION OF THE DRAWINGS

Further advantages and features according to the present disclosure will become clear from the following detailed description provided as a non-limiting example, with reference to the attached drawings in which.

Figure 1:
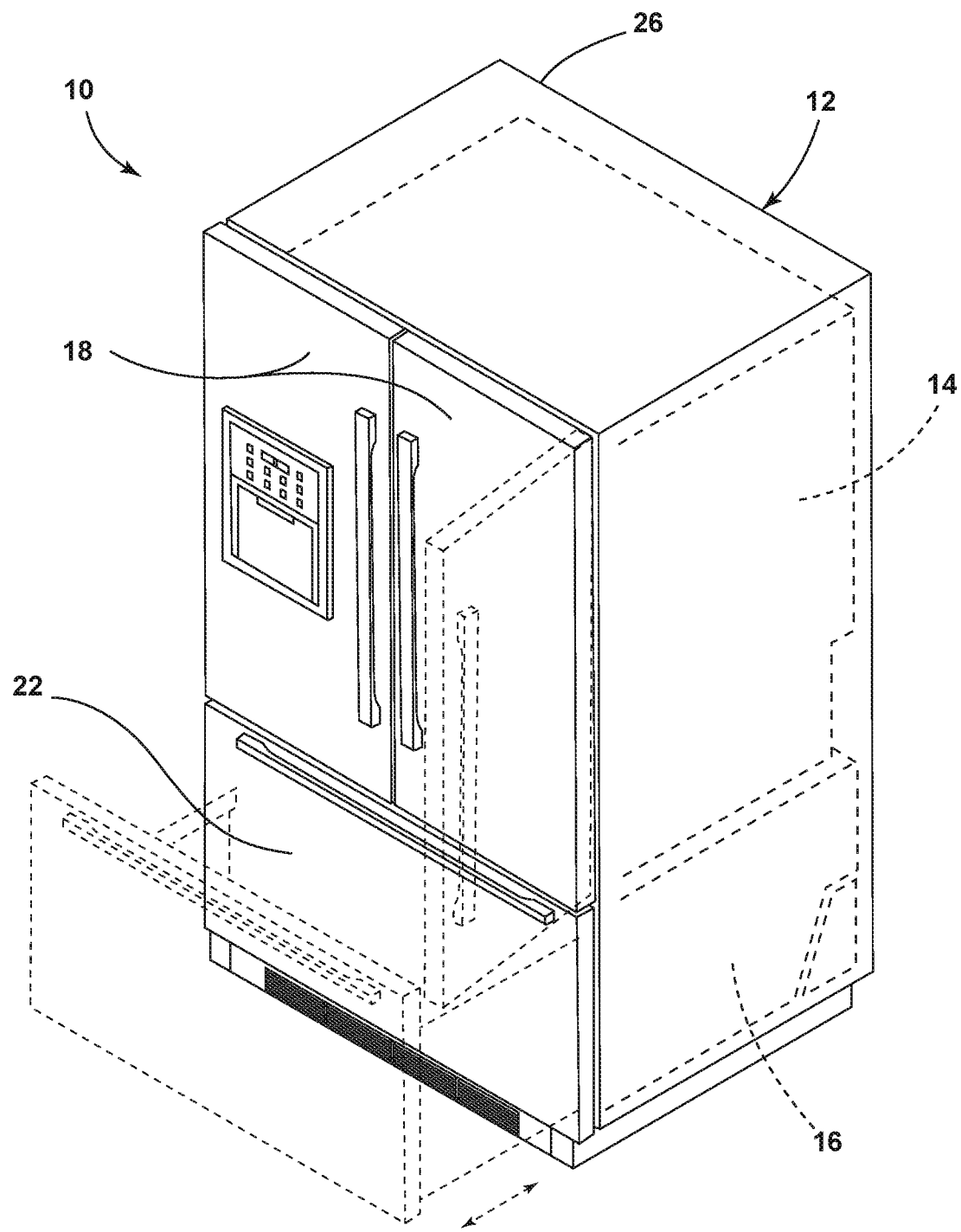
FIG. 1 is a perspective view of a refrigerator, illustrating a vacuum insulated cabinet with an external wrapper partially enclosing a fresh food compartment and a frozen food compartment.

The components in the figures are not necessarily to scale, emphasis instead being placed upon illustrating the principles described herein.

DETAILED DESCRIPTION

The present illustrated embodiments reside primarily in combinations of method steps and apparatus components related to a vacuum insulated cabinet for a refrigerator. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the term "above" and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Figure 2:
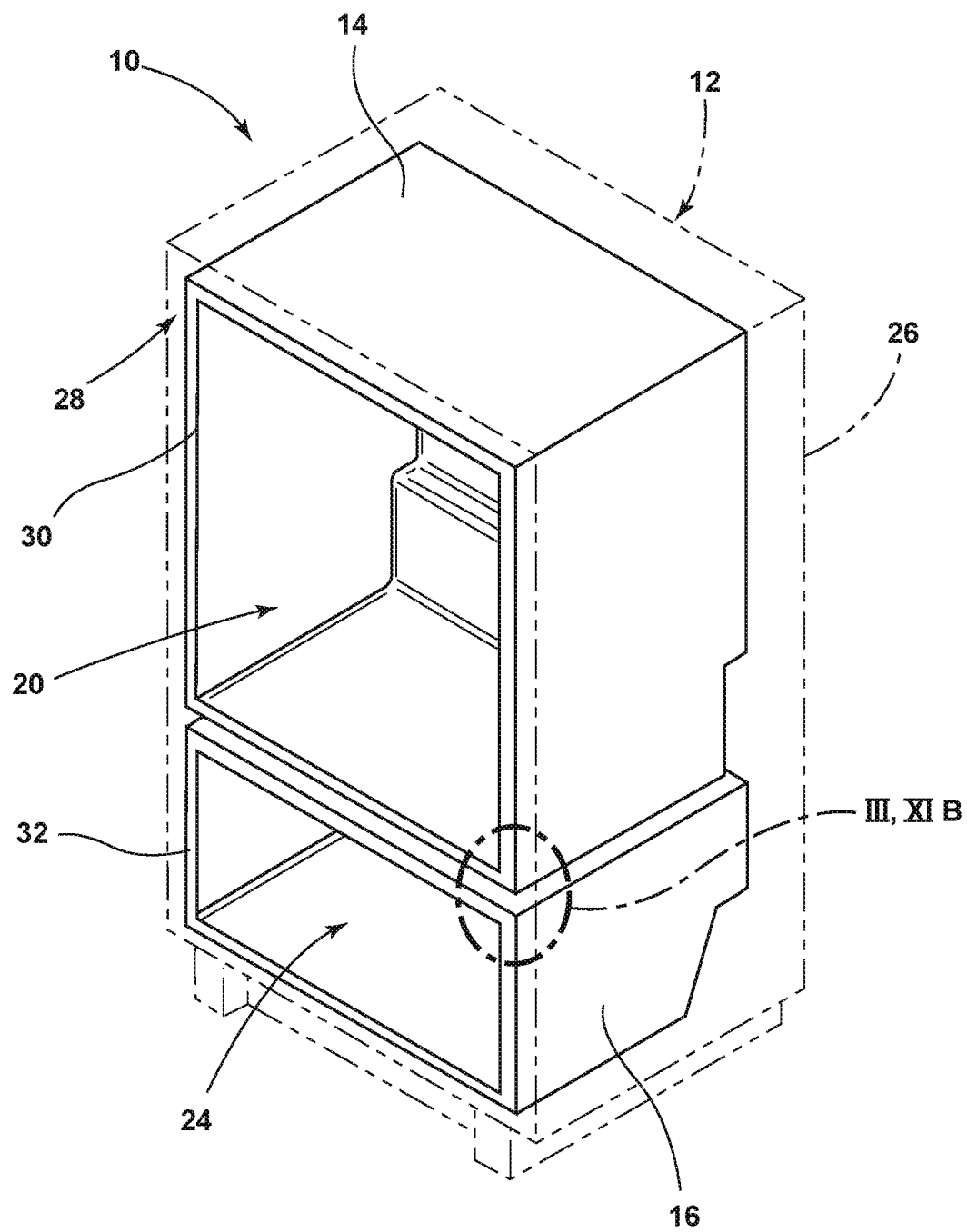
FIG. 2 is a perspective view of the refrigerator of FIG. 1, illustrating a first liner forming the fresh food compartment and a second liner forming the frozen food compartment, both disposed within an interior of the external wrapper.

Referring to FIGS. 1-2, a refrigerator 10 includes a vacuum insulated cabinet 12 with a fresh food compartment 14 and a frozen food compartment 16. Doors 18 can be opened to reveal an opening 20 to access the fresh food compartment 14. Drawer 22 can be opened to reveal an opening 24 to access the frozen food compartment 16. Note that the refrigerator 10 can take other forms. For example, a frozen food compartment 16 can be disposed either above or below the fresh food compartment 14. As another example, the refrigerator 10 may include only one of the fresh food compartment 14 or the frozen food compartment 16.

The vacuum insulated cabinet 12 includes an external wrapper 26. The external wrapper 26 forms an interior 28. The vacuum insulated cabinet 12 further includes a first liner 30 and optionally a second liner 32 disposed within the interior 28 of the external wrapper 26. The first liner 30 forms the fresh food compartment 14, while the second liner 32 forms the frozen food compartment 16. The refrigerator 10 further includes refrigeration cycle components (not illustrated), such as one or more of each of: a compressor, a condenser, an expansion valve, and an evaporator, as well as fluid lines connecting those components.

Figure 3:
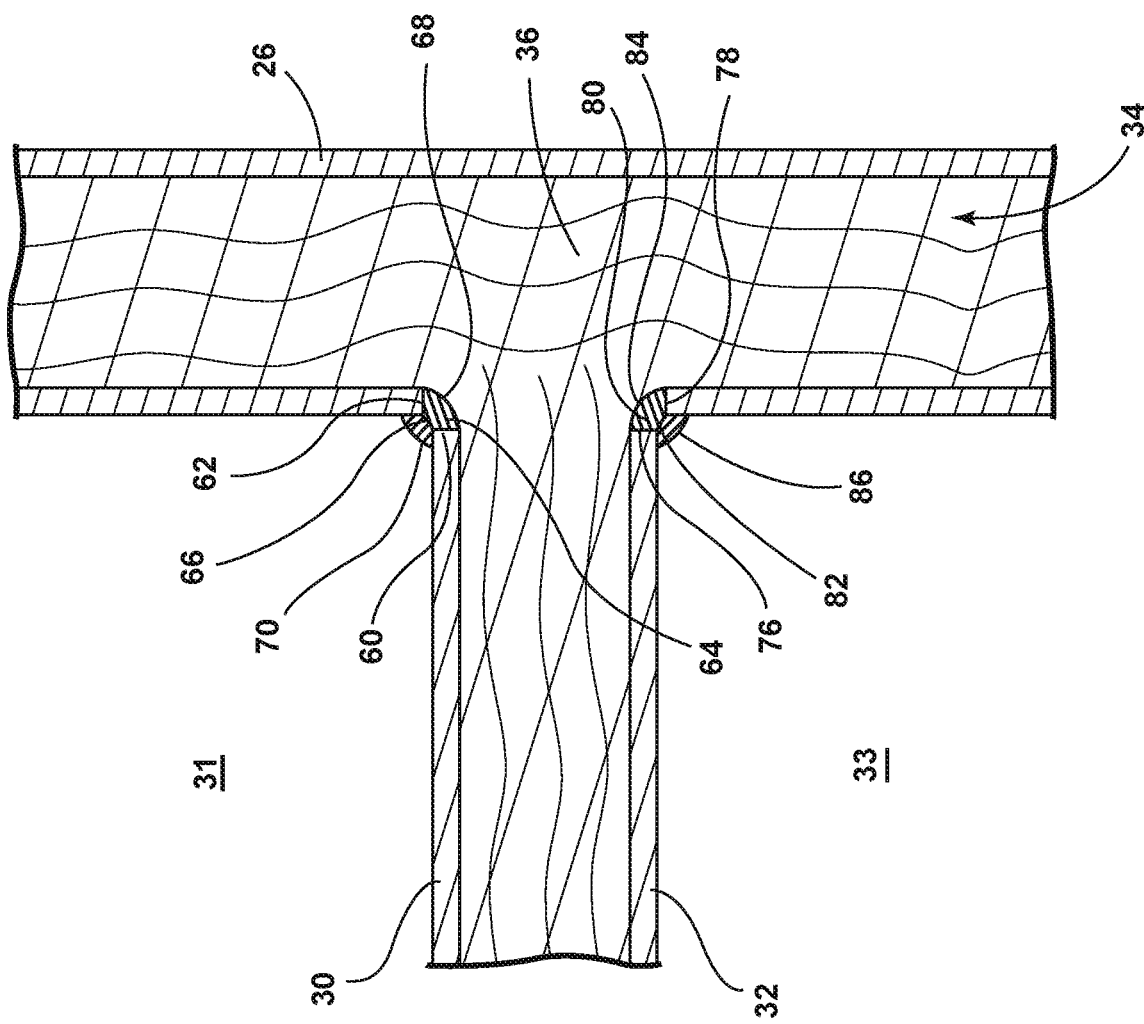
FIG. 3 is a front view of area III of FIG. 2, illustrating an adhesive covering an inboard-facing side of a welded area of the first liner, an adhesive covering an inboard-facing side of a welded area of the second liner, and a space separating the first liner, the second liner, and the external wrapper that is maintained at a reduced ("vacuum") pressure and housing a vacuum insulated core.

Referring now additionally to FIG. 3, the vacuum insulated cabinet 12 further includes a space 34 between the first liner 30 and the external wrapper 26. The space 34 is additionally between the second liner 32 and the external wrapper 26, and between the first liner 30 and the second liner 32. The space 34 is maintained at an air pressure less than the air pressure of the fresh food compartment 14, the frozen food compartment 16, or the ambient pressure exterior to the refrigerator 10. The vacuum insulated cabinet 12 includes a vacuum insulated core 36 disposed within this space 34.

Figure 4:
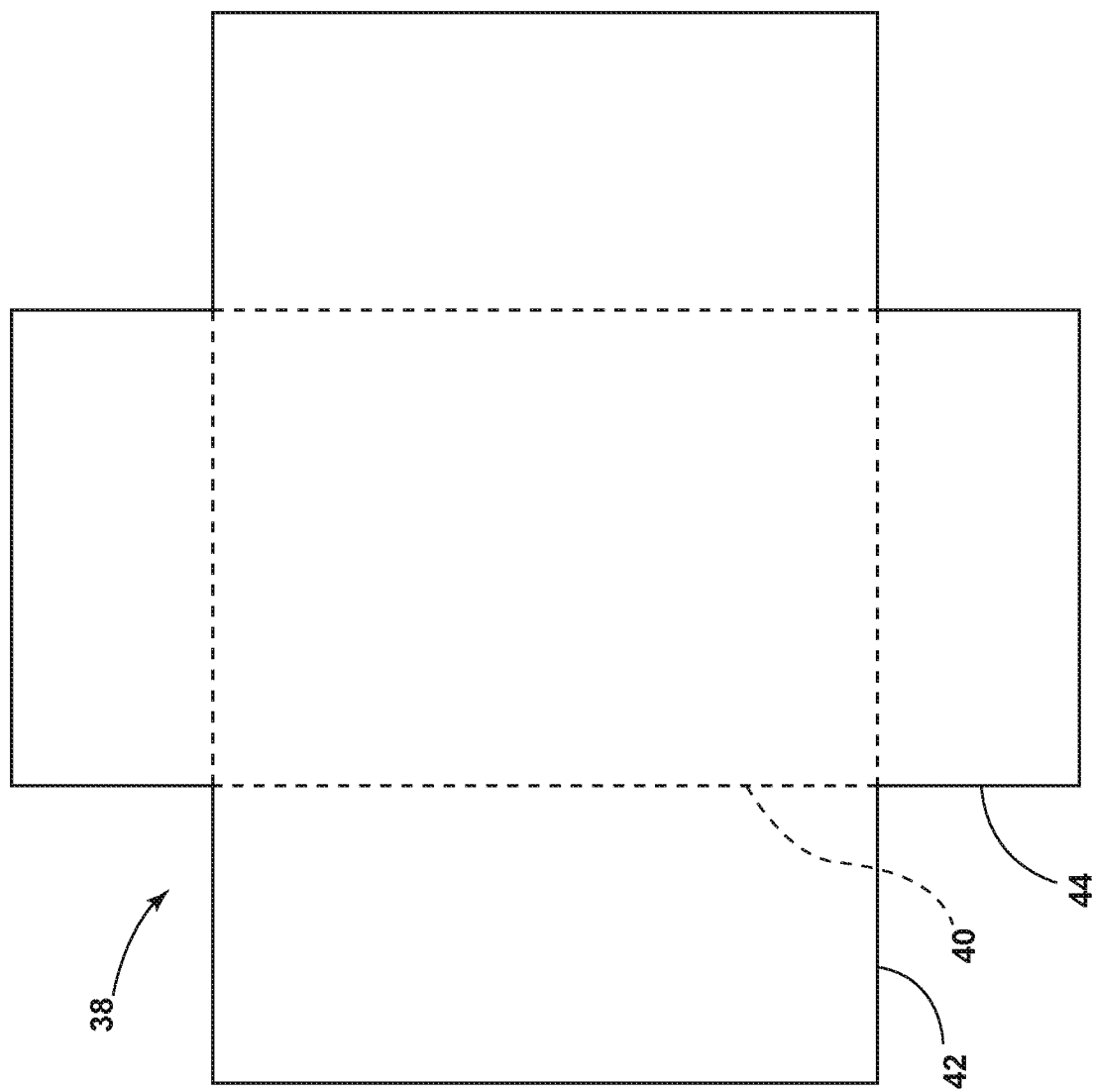
FIG. 4 is an overhead view of sheet metal from which the external wrapper of FIG. 1 is formed, illustrating several edges to be welded together.
Figure 5:
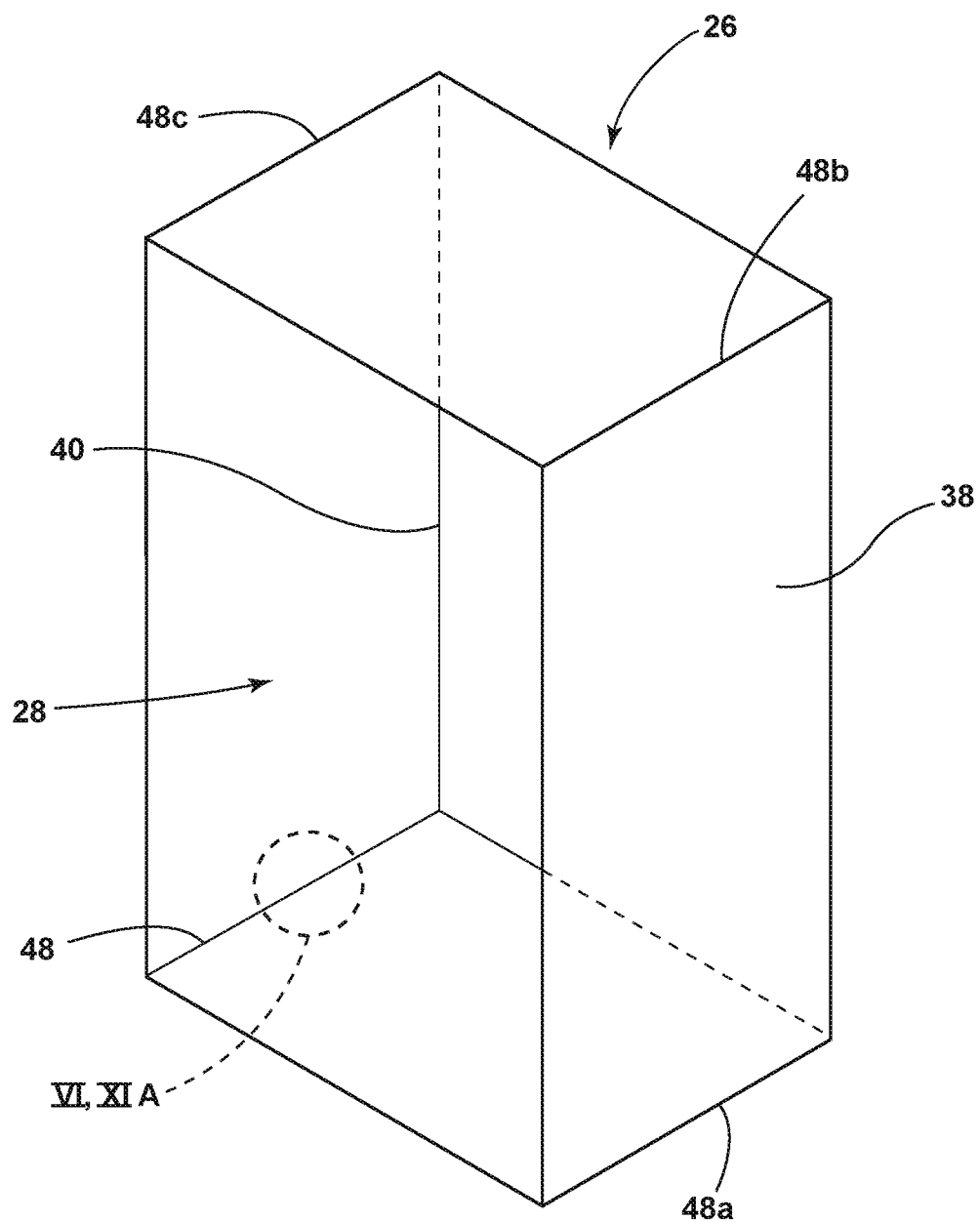
FIG. 5 is a perspective view of the external wrapper of FIG. 1 formed from welding the sheet metal of FIG. 4, illustrating welded areas and an interior in which the first liner and the second liner is to be disposed.
Figure 6:
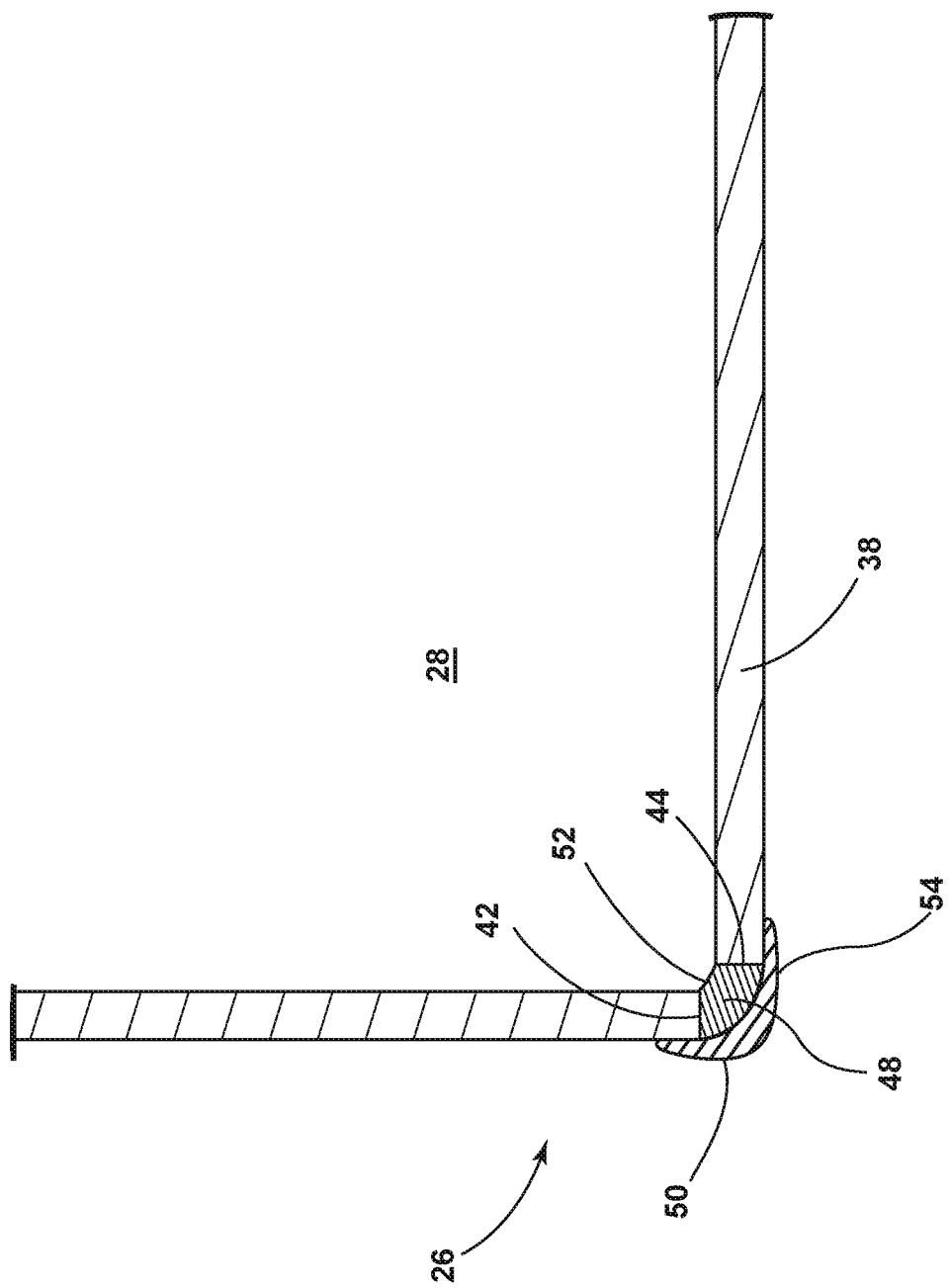
FIG. 6 is a front view of area VI of FIG. 5, illustrating two edges welded together forming a welded area with an inboard-facing side and an outboard-facing side and an adhesive covering the outboard-facing side.

Referring now additionally to FIGS. 4-6, the external wrapper 26 is formed from sheet metal 38. The sheet metal 38 can be a solitary stamped piece of sheet metal 38 as illustrated in FIG. 4, or can be more than one piece of sheet metal 38 assembled together. The sheet metal 38 can be bent along dotted lines 40 (FIG. 4) to form the desired shape of the external wrapper 26 (FIG. 5) including the interior 28 within which the first liner 30 and second liner 32 are to be disposed. The sheet metal 38 is then welded to form the solid contiguous structure of the external wrapper 26. For example, edge 42 and edge 44 of sheet metal 38 (FIG. 4) are welded together to form a welded area 48 of the external wrapper 26 (FIG. 5). The external wrapper 26 includes other welded areas 48a, 48b, 48c, etc., depending on the shape and number of separate pieces of sheet metal 38 utilized. Because all of the welded areas 48, 48a, 48b, 48c, etc., are the same for purposes of this disclosure and will be referred to individually and collectively as welded area 48 or welded areas 48. Each of the welded areas 48 includes an inboard-facing side 52 and an outboard-facing side 50 (FIG. 6). In general, the inboard-facing side 52 faces inward toward the interior 28, while the outboard-facing side 50 faces outward away from the interior 28. An adhesive 54 is then applied to cover the welded areas 48. Without the adhesive 54, the welded areas 48 may be too porous to maintain lower pressure (vacuum insulation) within the space 34, and air would flow in the direction from the outboard-facing side 50 through the welded areas 48 to the inboard-facing side 52 and into the space 34. When the adhesive 54 is applied to the welded areas 48, air does not flow through the welded areas 48 in this manner and the lower pressure can be maintained in the space 34. In other words, the adhesive 54 acts as a secondary sealant to block air that may have otherwise flowed through the welded areas 48. The adhesive 54 can be applied to the outboard-facing side 50, to the inboard-facing side 52, or to both the outboard-facing side 50 and the inboard-facing side 52 of each welded area 48. Applying adhesive 54 to only the inboard-facing side 52 of each of the welded areas 48 can be advantageous to improve consumer satisfaction because the adhesive 54 is hidden from view. Applying adhesive 54 to only the outboard-facing side 50 of each of the welded areas 48 can be advantageous to provide a longer lasting bond between the adhesive 54 and the welded area 48, because the inboard-facing side 52 is the side of the welded area 48 subject to reduced air pressure. Therefore, in an embodiment of the vacuum insulated cabinet 12, the external wrapper 26 forms an interior 28, and the external wrapper 26 includes sheet metal 38 with welded areas 48 that have outboard-facing sides 50 and adhesive 54 covering the outboard-facing sides 50 of the welded areas 48. In another embodiment (not illustrated) of the vacuum insulated cabinet 12, the external wrapper 26 forms an interior 28, and the external wrapper 26 includes sheet metal 38 including welded areas 48 that have inboard-facing sides 52 and adhesive 54 covering the inboard-facing sides 52 of the welded areas 48. In still another embodiment (not illustrated) of the vacuum insulated cabinet 12, the external wrapper 26 forms an interior 28, and the external wrapper 26 includes sheet metal 38 including welded areas 48 that have outboard-facing sides 50 and inboard-facing sides 52, and adhesive 54 covering both the outboard-facing sides 50 and the inboard-facing sides 52 of the welded areas 48.

Figure 7:
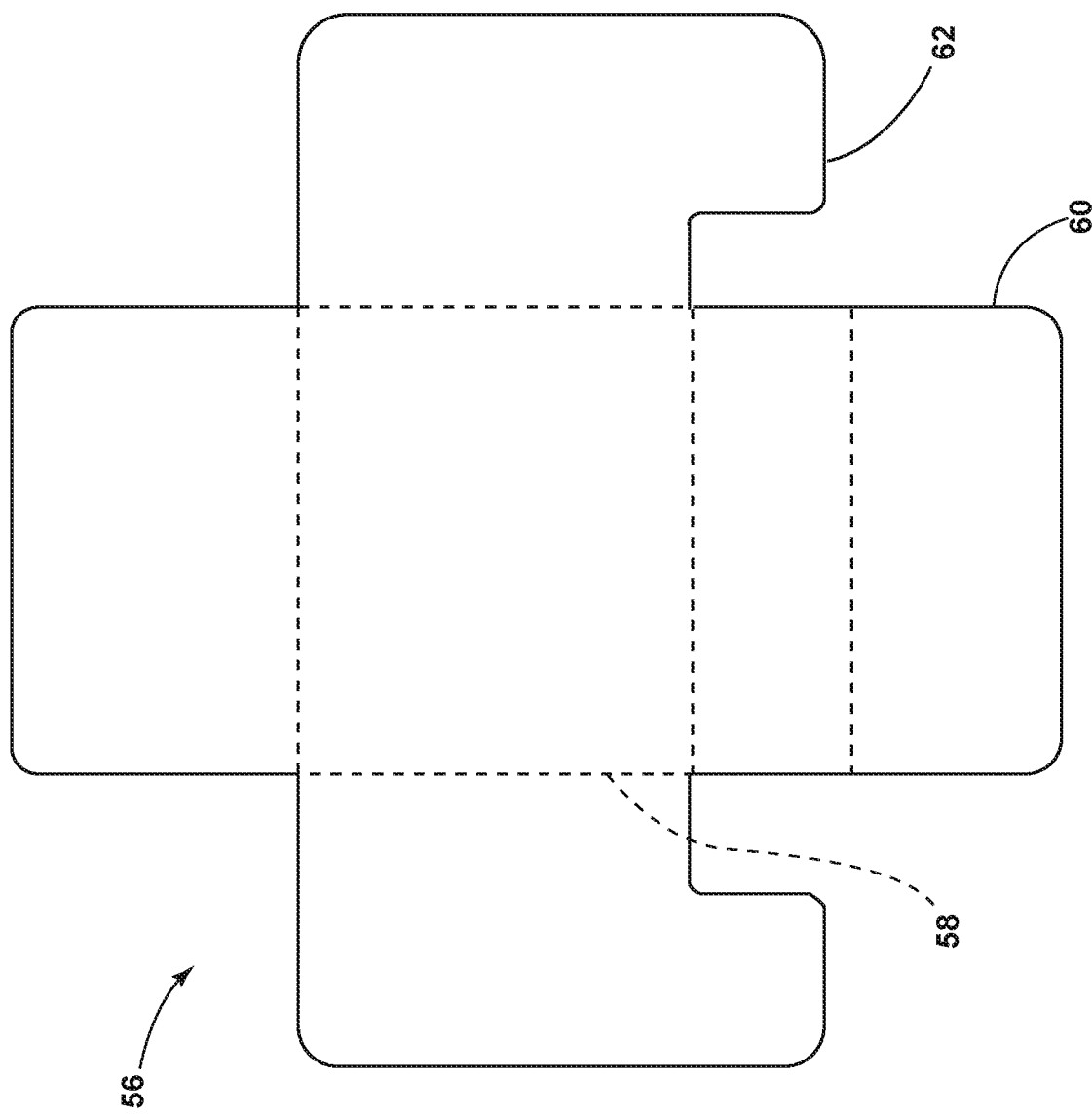
FIG. 7 is an overhead view of sheet metal from which the first liner of FIG. 2 is formed, illustrating several edges to be welded together.
Figure 8:
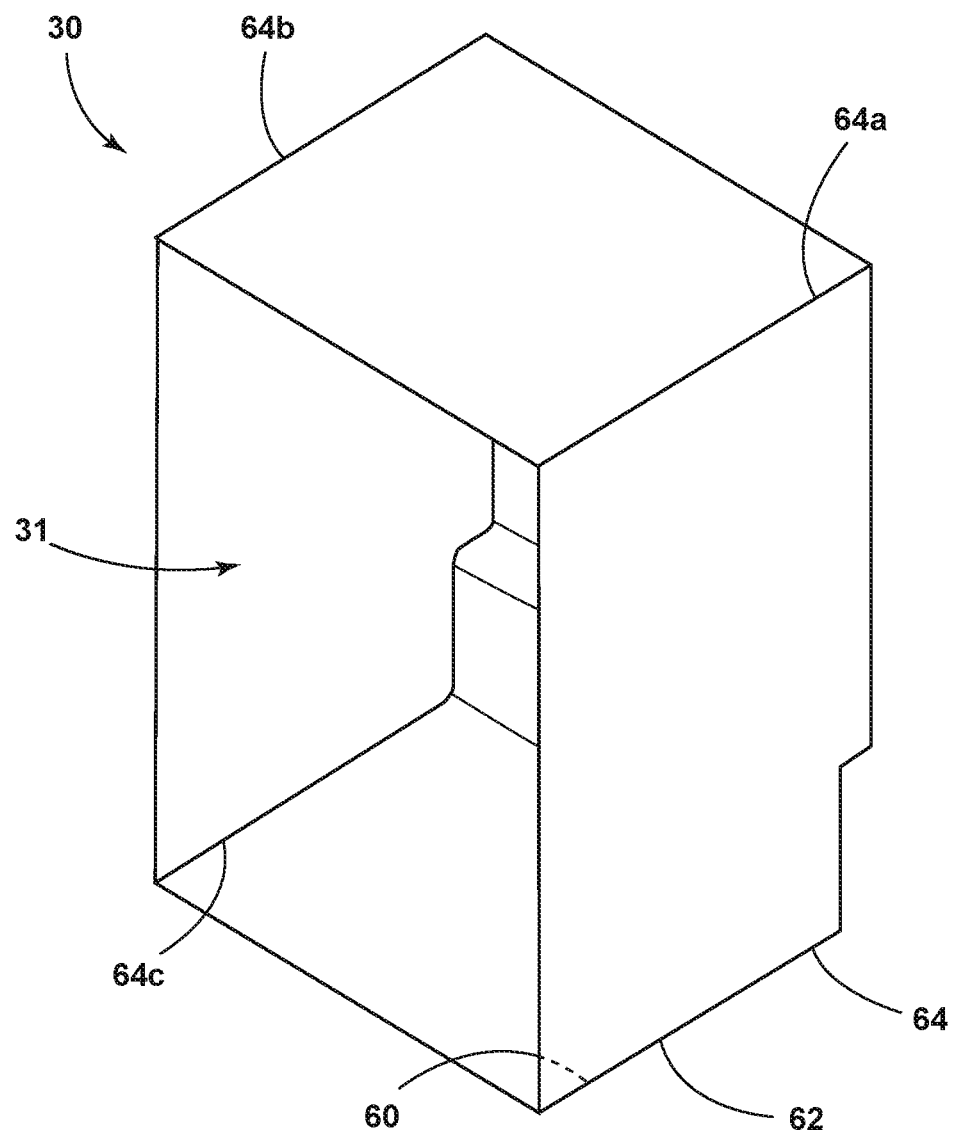
FIG. 8 is a perspective view of the first panel of FIG. 2 formed from welding the sheet metal of FIG. 7, illustrating welded areas.

Referring now to FIGS. 7-8, the first liner 30 is likewise formed of sheet metal 56. The sheet metal 56 can be a solitary stamped piece of sheet metal 56 as illustrated in FIG. 7, or can be more than one piece of sheet metal 56 assembled together. The sheet metal 56 can be bent along dotted lines 58 (FIG. 7) to form the desired shape of the first liner 30. The sheet metal 56 is then welded to form the solid contiguous structure of the first liner 30 that is to be disposed within the interior 28 of the external wrapper 26. For example, edge 60 and edge 62 are welded together to form a welded area 64 of the first liner 30 (FIG. 8). The first liner 30 includes other welded areas 64a, 64b, 64c, etc., depending on the shape and number of separate pieces of sheet metal 56 utilized. As before, the welded areas 64, 64a, 64b, 64c, etc., are the same for purposes of this disclosure and will be referred to individually and collectively as welded area 64 or welded areas 64. Each of the welded areas 64 includes an inboard-facing side 66 and an outboard-facing side 68 (FIG. 3). In general, the inboard-facing side 66 faces an interior 31 of the first liner 30, while the outboard-facing side 68 faces away from the interior 31 of the first liner 30 and toward the space 34. An adhesive 70 is then applied to the inboard-facing sides 66 of the welded areas 64, the outboard-facing sides 68, or both the inboard-facing sides 66 and the outboard-facing sides 68. The embodiment illustrated in FIG. 3 illustrates the adhesive 70 applied to the inboard-facing side 66 of the welded area 64 of the first liner 30. Applying adhesive 70 to only the outboard-facing side 68 of each of the welded areas 64 can be advantageous to improve consumer satisfaction because the adhesive 70 is then hidden from view. Applying adhesive 70 to only the inboard-facing side 66 of each of the welded areas 64 can be advantageous to provide a longer lasting bond between the adhesive 70 and the welded area 64, because the welded area 64 is otherwise gas permeable and the outboard-facing side 68 is subject to a reduced pressure environment of the space 34. The first liner 30 is then disposed within the interior 28 of the external wrapper 26, leaving the space 34 between the first liner 30 and the external wrapper 26. Vacuum insulated core 36 can be disposed within the space 34.

Figure 9:
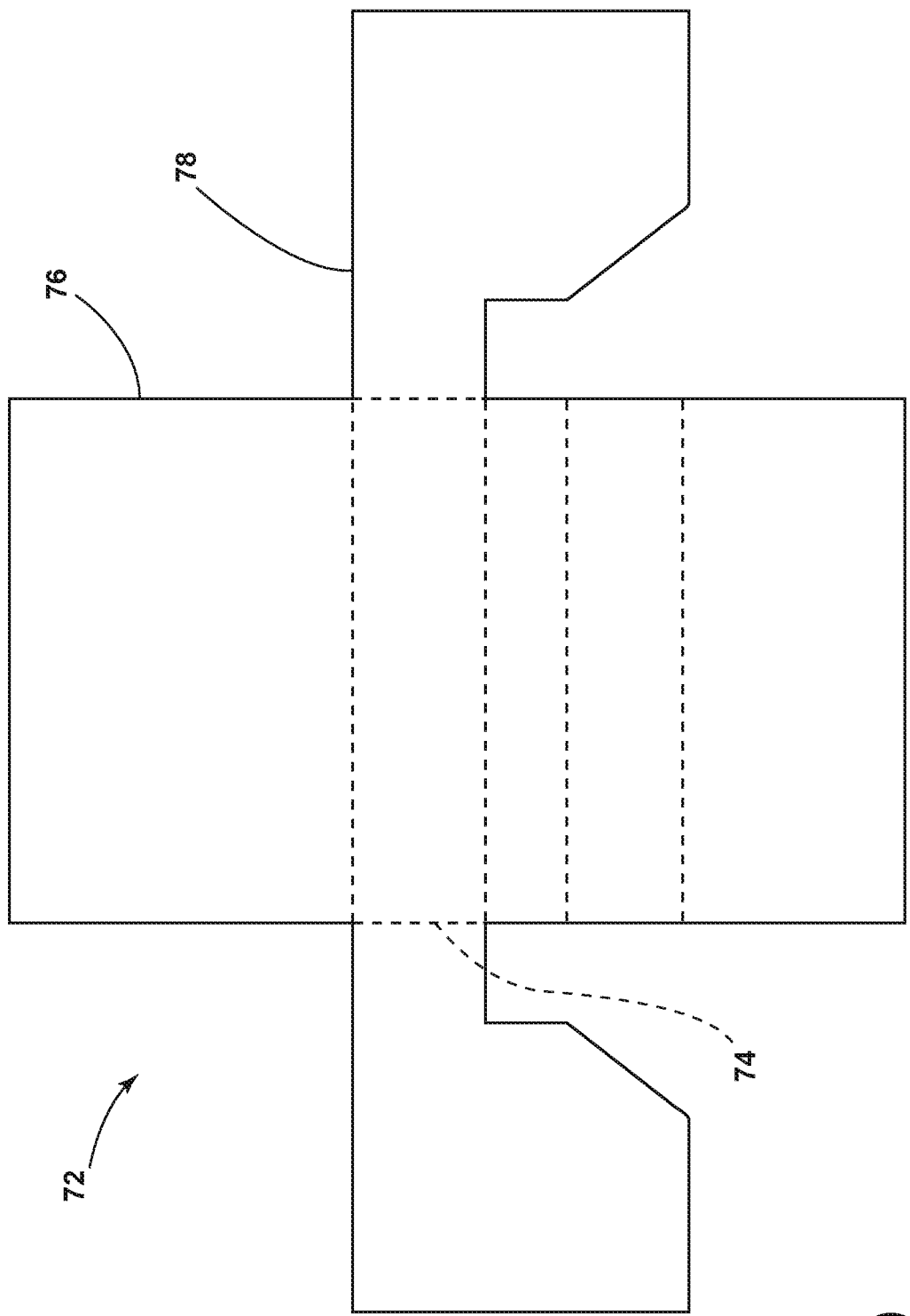
FIG. 9 is an overhead view of sheet metal from which the second liner of FIG. 2 is formed, illustrating several edges to be welded together.
Figure 10:
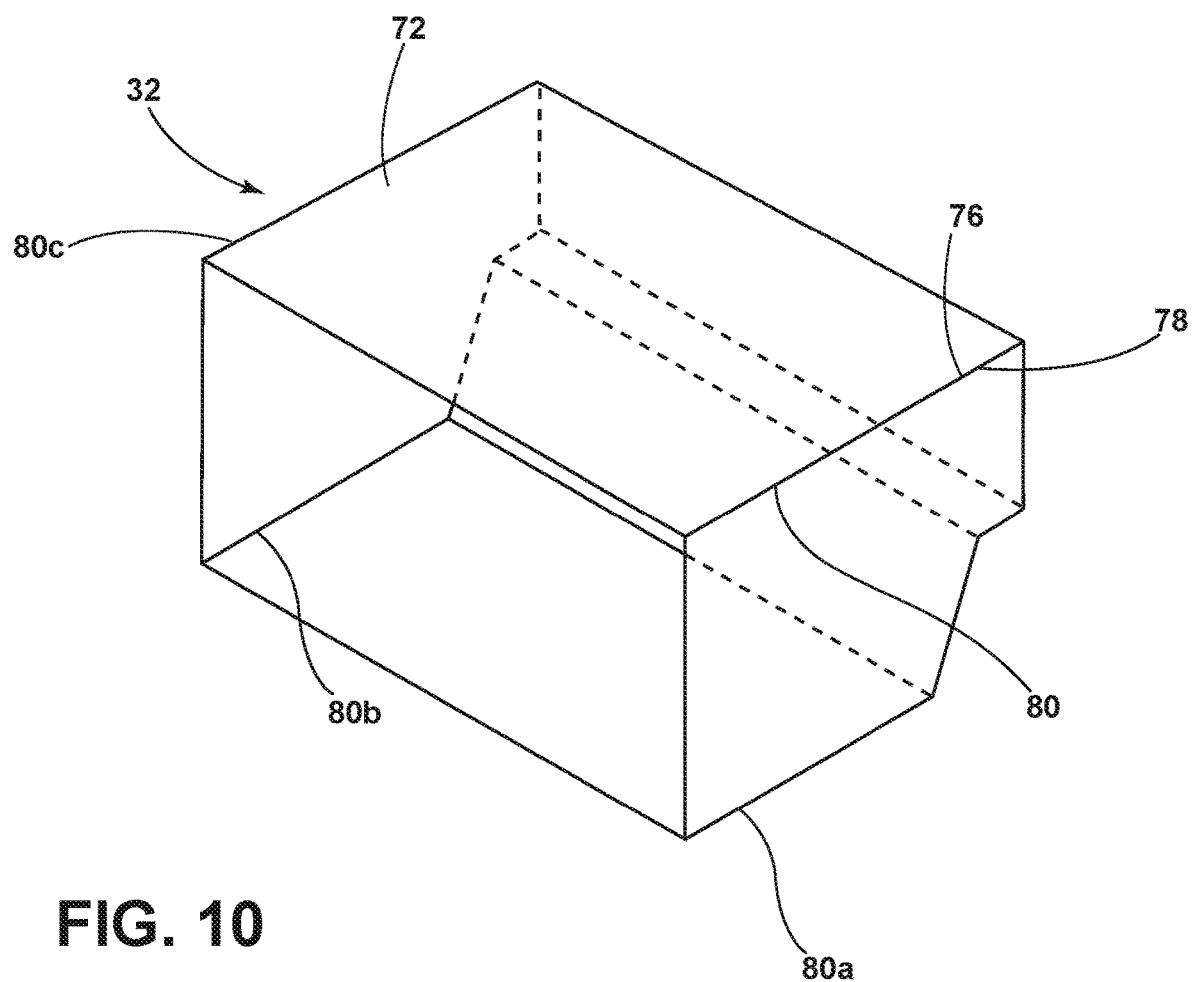
FIG. 10 is a perspective view of the second panel of FIG. 2 formed from welding the sheet metal of FIG. 9, illustrating welded areas.

Referring now to FIGS. 9-10, the second liner 32 is likewise formed of sheet metal 72. The sheet metal 72 can be a solitary stamped piece of sheet metal 72 as illustrated in FIG. 9, or can be more than one piece of sheet metal 72 assembled together. The sheet metal 72 can be bent along dotted lines 74 (FIG. 9) to form the desired shape of the second liner 32. The sheet metal 72 is then welded to form the solid contiguous structure of the second liner 32 that is to be disposed within the interior 28 of the external wrapper 26. For example, edge 76 and edge 78 are welded together to form a welded area 80 of the second liner 32 (FIG. 10). The second liner 32 includes other welded areas 80a, 80b, 80c, etc., depending on the shape and number of separate pieces of sheet metal 72 utilized. As before, the welded areas 80, 80a, 80b, 80c, etc., are the same for purposes of this disclosure and will be referred to individually and collectively as welded area 80 or welded areas 80. Each of the welded areas 80 includes an inboard-facing side 82 and an outboard-facing side 84 (FIG. 3). In general, the inboard-facing side 82 faces an interior 33 of the second liner 32, while the outboard-facing side 84 faces away from the interior 33 of the second liner 32 and toward the space 34. An adhesive 86 is then applied to the inboard-facing sides 82 of the welded areas 80, the outboard-facing sides 84, or both the inboard-facing sides 82 and the outboard-facing sides 84. The embodiment illustrated in FIG. 3 illustrates the adhesive 86 applied to the inboard-facing side 82 of the welded area 80 of the second liner 32. Applying adhesive 86 to only the outboard-facing side 84 of each of the welded areas 80 can be advantageous to improve consumer satisfaction because the adhesive 86 is then hidden from view. Applying adhesive 86 to only the inboard-facing side 82 of each of the welded areas 80 can be advantageous to provide a longer lasting bond between the adhesive 86 and the welded area 80, because the welded area 80 is otherwise gas permeable and the outboard-facing side 84 is subject to a reduced pressure environment. The second liner 32 is then disposed within the interior 28 of the external wrapper 26, leaving the space 34 between the second liner 32 and the external wrapper 26 as well as the space 34 between the first liner 30 and the second liner 32. The welded areas 48, 64, 80 of the external wrapper 26, the first liner 30, and the second liner 32, respectively, can be formed via laser welding, magnetic pulse welding, and supersonic welding, among other types of welding, such as MIG, TIG, resistance, etc.

The adhesive 54 applied to the welded areas 48 of the external wrapper 26, such as to the outboard-facing side 50 of the welded areas 48 of the external wrapper 26, are applied in one layer. Accordingly, the adhesive 54 covering the outboard-facing sides 50 of the welded areas 48 of the external wrapper 26 is one layer of adhesive 54. Likewise, the adhesive 70 applied to welded areas 64 of the first liner 30, such as to the inboard-facing sides 66 of the welded areas 64 of the first liner 30, are applied in one layer. Accordingly, the adhesive 70 covering the inboard-facing sides 66 of the welded areas 64 of the first liner 30 is one layer of adhesive 70. And, the adhesive 86 applied to welded areas 80 of the second liner 32, such as to the inboard-facing sides 82 of the welded areas 80 of the second liner 32, are applied in one layer. Accordingly, the adhesive 86 covering the inboard-facing sides 82 of the welded areas 80 of the second liner 32 is one layer of adhesive 86.

Figure 11A:
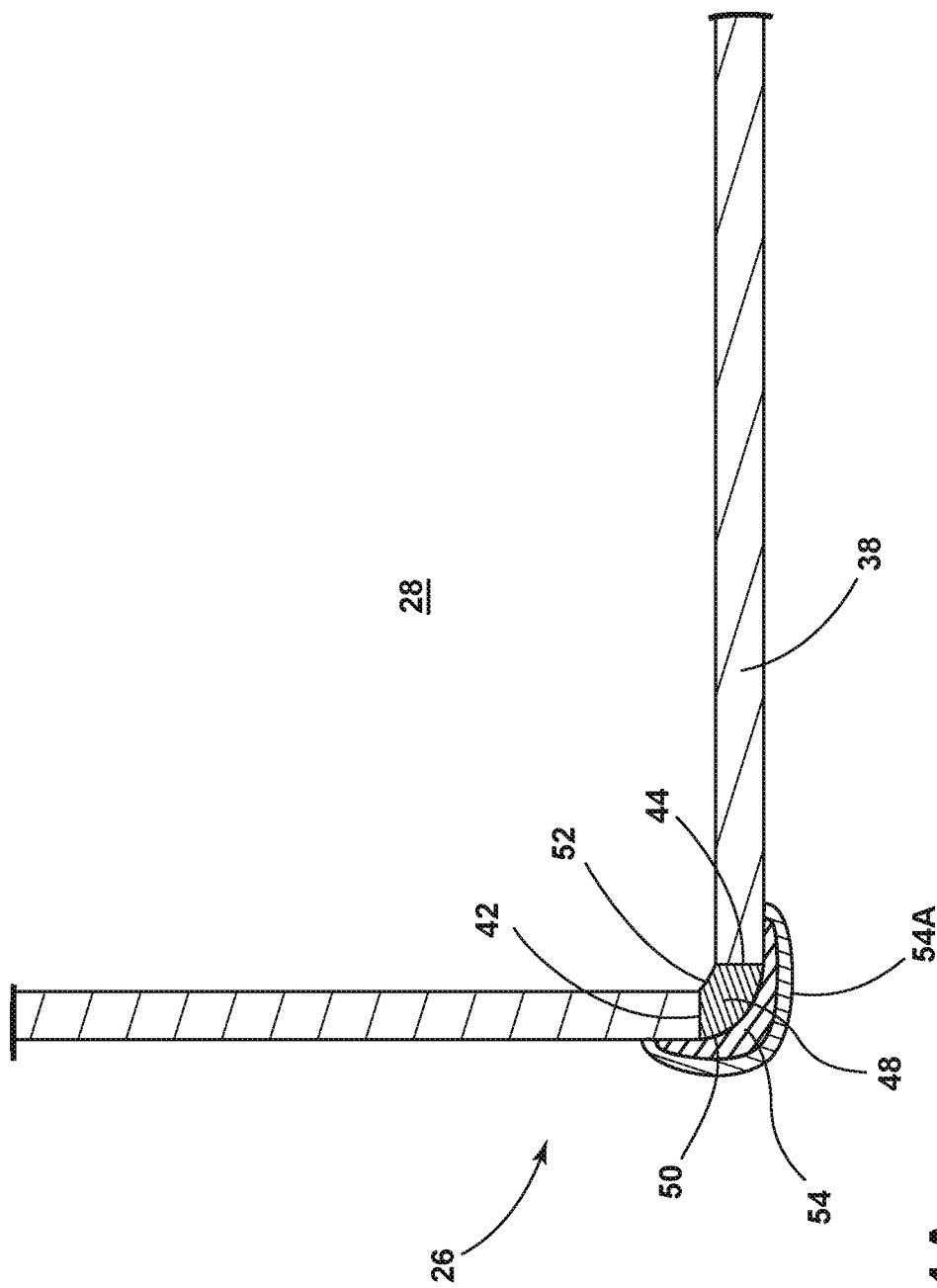
FIG. 11A is a front view of area XIA of FIG. 5, illustrating an alternative embodiment including the first adhesive covering the outboard-facing side of the welded area and a second adhesive covering the first adhesive.
Figure 11B:
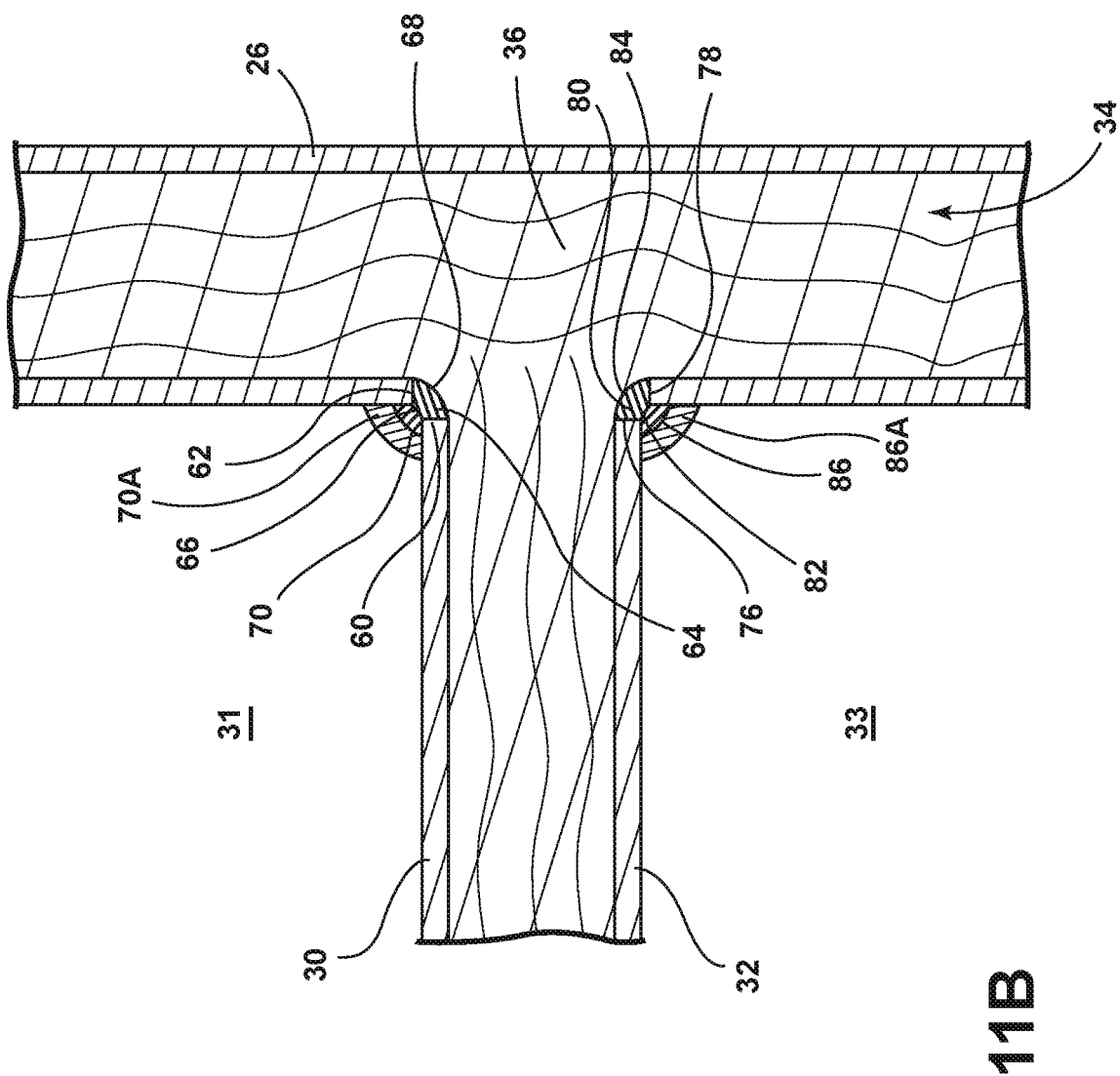
FIG. 11B is a front view of area XIB of FIG. 2, illustrating an alternative embodiment including a second adhesive covering the first adhesive covering the inboard-facing side of the welded area of the first liner and a second adhesive covering the first adhesive covering the inboard-facing side of the welded area of the second liner.

Alternatively, referring now to FIGS. 11A and 11B, a second layer of adhesive 54A can be applied over the first layer of adhesive 54 of the external wrapper 26. Adhesive 54A can be a different adhesive than adhesive 54, but alternatively could be the same adhesive as adhesive 54. For example, a layer of second adhesive 54A, different than the first adhesive 54, can be applied to the welded areas 48 of the external wrapper 26 over the first adhesive 54. As such, a layer of second adhesive 54A, different than the first adhesive 54, can be applied to the outboard-facing sides 50 of the welded areas 48 of the external wrapper 26 over the first adhesive 54. Therefore, this embodiment of the external wrapper 26 further includes a second adhesive 54A covering the adhesive 54 covering the outboard-facing sides 50 of the welded areas 48, where second adhesive 54A and adhesive 54 are different. An alternative embodiment of the external wrapper 26 (not illustrated) further includes a second adhesive 54A covering the adhesive 54 covering the inboard-facing side inboard-facing side 52s of the welded areas 48, where second adhesive 54A and adhesive 54 are different.

Likewise, a second layer of adhesive 70A (FIG. 11B) can be applied over the first layer of adhesive 70 of the first liner 30. Adhesive 70A can be a different adhesive than adhesive 70. For example, a layer of second adhesive 70A, different than the first adhesive 70, can be applied to the welded areas 64 of the first liner 30 over the first adhesive 70. As such, a layer of second adhesive 70A, different than the first adhesive 70, can be applied to the inboard-facing sides 66 of the welded areas 64 of the first liner 30 over the first adhesive 70. Therefore, this embodiment of the first liner 30 further includes a second adhesive 70A covering the adhesive 70 covering the inboard-facing sides 66 of the welded areas 64, where second adhesive 70A and adhesive 70 are different. An alternative embodiment of the first liner 30 (not illustrated) further includes a second adhesive 70A covering the adhesive 70 covering the outboard-facing sides 68 of the welded areas 48, where second adhesive 70A and adhesive 70 are different.

Likewise, a second layer of adhesive 86A can be applied over the first layer of adhesive 86 of the second liner 32. Adhesive 86A can be a different adhesive than adhesive 86. For example, a layer of second adhesive 86A, different than the first adhesive 86, can be applied to the welded areas 80 of the second liner 32 over the first adhesive 86. As such, a layer of second adhesive 86A, different than the first adhesive 86, can be applied to the inboard-facing sides 82 of the welded areas 80 of the second liner 32 over the first adhesive 86. Therefore, this embodiment of the second liner 32 further includes a second adhesive 86A covering the adhesive 86 covering the inboard-facing sides 82 of the welded areas 80, where second adhesive 86A and adhesive 86 are different. An alternative embodiment of the second liner 32 (not illustrated) further includes a second adhesive 86A covering the adhesive 86 covering the outboard-facing sides 84 of the welded areas 80, where second adhesive 86A and adhesive 86 are different.

The adhesive 54 (or adhesive 54 plus adhesive 54A) applied to the welded areas 48 of the external wrapper 26 has a thickness of between 0.05 inches and 1.5 inches (and preferably about 0.0787 inches/2 millimeters). For example, adhesive 54 applied to the outboard-facing side 50 of the welded area 48 of the external wrapper 26 has a thickness of between 0.05 inches and 1.5 inches (and preferably about 0.0787 inches/2 millimeters). Thus, the adhesive 54 covering the outboard-facing side 50 of each of the welded areas 48 of the external wrapper 26 has a thickness of between 0.05 inches and 1.5 inches (and preferably about 0.0787 inches/2 millimeters).

Likewise, the adhesive 70 (or adhesive 70 plus adhesive 70A) applied to the welded areas 64 of the first liner 30 has a thickness of between 0.05 inches and 1.5 inches (and preferably about 0.0787 inches/2 millimeters). For example, adhesive 70 applied to the inboard-facing side 66 of the welded area 64 of the first liner 30 has a thickness of between 0.05 inches and 1.5 inches (and preferably about 0.0787 inches/2 millimeters). Thus, the adhesive 70 covering the inboard-facing side 66 of each of the welded areas 64 of the first liner 30 has a thickness of between 0.05 inches and 1.5 inches (and preferably about 0.0787 inches/2 millimeters).

Likewise, the adhesive 86 (or adhesive 86 plus adhesive 86A) applied to the welded areas 80 of the second liner 32 has a thickness of between 0.05 inches and 1.5 inches (and preferably about 0.0787 inches/2 millimeters). For example, adhesive 86 applied to the inboard-facing side 82 of the welded area 80 of the second liner 32 has a thickness of between 0.05 inches and 1.5 inches (and preferably about 0.0787 inches/2 millimeters). Thus, the adhesive 86 covering the inboard-facing side 82 of each of the welded areas 80 of the second liner 32 has a thickness of between 0.05 inches and 1.5 inches (and preferably about 0.0787 inches/2 millimeters).

The adhesives 54, 54A, 70, 70A, 86, 86A can be one or more of a silicone adhesive, a polyurethane adhesive, an epoxy adhesive, or an acrylic adhesive. The silicone adhesive can be a two-component system, which when combined cross-links. The adhesives 54, 54A, 70, 70A, 86, 86A should have a low oxygen permeation rate, a low water vapor permeation rate, and/or a low nitrogen permeation rate. The adhesives 54, 54A, 70, 70A, 86, 86A should have a high viscosity when being applied, adhere well in a wide temperature range after application (e.g., −30 degrees Celsius to 100 degrees Celsius), and be fast curing after application (i.e., cure within less than ten minutes).

Accordingly, the adhesive 54 applied to the outboard-facing side 50 of the each of the welded areas 48 of the external wrapper 26 can be one or more of: a silicone adhesive, a polyurethane adhesive, an epoxy adhesive, or an acrylic adhesive. Thus, adhesive 54 covering the outboard-facing side 50 of each of the welded areas 48 of the external wrapper 26 is one or more of: a silicone adhesive, a polyurethane adhesive, an epoxy adhesive, or an acrylic adhesive.

Likewise, the adhesive 70 applied to the inboard-facing side 66 of the each of the welded areas 64 of the first liner 30 can be one or more of: a silicone adhesive, a polyurethane adhesive, an epoxy adhesive, or an acrylic adhesive. Thus, adhesive 70 covering the inboard-facing side 66 of each of the welded areas 64 of the first liner 30 is one or more of: a silicone adhesive, a polyurethane adhesive, an epoxy adhesive, or an acrylic adhesive. Likewise, the adhesive 86 applied to the inboard-facing side 82 of the each of the welded areas 80 of the second liner 32 can be one or more of: a silicone adhesive, a polyurethane adhesive, an epoxy adhesive, or an acrylic adhesive. Thus, adhesive 86 covering the inboard-facing side 82 of each of the welded areas 80 of the second liner 32 is one or more of: a silicone adhesive, a polyurethane adhesive, an epoxy adhesive, or an acrylic adhesive.

To improve bonding of the adhesives 54, 70, 86 to the welded areas 48, 64, 80, respectively, of the external wrapper 26, first liner 30, and second liner 32 respectively, the welded areas 48, 64, 80, are first cleaned with a liquid cleaner (such as a grease remover). The welded areas 48, 64, 80, are then further cleaned with a plasma jet.

Use of the adhesives 54, 70, 86 to cover the welded areas 48, 64, 80 of the external wrapper 26, first liner 30, and second liner 32, respectively, as described above solves the problem described of air leaking through the pores of the welded areas 48, 64, 80. Therefore, because of the use of the adhesives 54, 70, 86, sheet metal can now be utilized to form the external wrapper 26, first liner 30, and second liner 32, and allow the use of the external wrapper 26, first liner 30, and second liner 32 in a vacuum insulated refrigerator. The adhesives 54, 70, 86 prevent air from leaking through the welded areas 48, 64, 80, and thus lowered pressure can be maintained within the space 34.

It will be understood by one having ordinary skill in the art that construction of the described disclosure and other components is not limited to any specific material. Other exemplary embodiments of the disclosure disclosed herein may be formed from a wide variety of materials, unless described otherwise herein.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A method of making a vacuum insulated cabinet for a refrigerator comprising:
    welding sheet metal to form an external wrapper, the external wrapper including an interior and welded areas with an outboard-facing side and an inboard-facing side;
    welding sheet metal to form a first liner configured to be disposed within the interior of the external wrapper, the first liner including welded areas with an outboard-facing side and an inboard-facing side;
    applying an adhesive to at least one of the outboard-facing side and the inboard-facing side of the welded areas of the external wrapper;
    applying an adhesive to at least one of the outboard-facing side and the inboard-facing side of the welded areas of the first liner; and
    disposing the first liner within the interior of the external wrapper, leaving a space between the first liner and the external wrapper.

2. The method of claim 1 further comprising:
    welding sheet metal together to form a second liner configured to be disposed within the interior of the external wrapper, the second liner including welded areas with an outboard-facing side and an inboard-facing side;
    applying an adhesive to at least one of the outboard-facing side and the inboard-facing side of the welded areas of the second liner; and
    disposing the second liner within the interior of the external wrapper, leaving a space between the second liner and the external wrapper, and a space between the second liner and the first liner.

3. The method of claim 1,
wherein, the adhesive is applied to at least the outboard-facing side of the welded areas of the external wrapper; and
wherein, the adhesive is applied to at least the inboard-facing side of the welded areas of the first liner.

4. The method of claim 2,
wherein, the adhesive is applied to at least the outboard-facing side of the welded areas of the external wrapper;
wherein, the adhesive is applied to at least the inboard-facing side of the welded areas of the first liner; and
wherein, the adhesive is applied to at least the inboard-facing side of the welded areas of the second liner.

5. The method of claim 1 further comprising:
applying a second adhesive, different than the adhesive, over the adhesive applied over the welded areas of the external wrapper; and
applying a second adhesive, different than the adhesive, over the adhesive applied over the welded areas of the first liner.

6. The method of claim 2 further comprising:
applying a second adhesive, different than the adhesive, over the adhesive applied over the welded areas of the external wrapper;
applying a second adhesive, different than the adhesive, over the adhesive applied over the welded areas of the first liner; and
applying a second adhesive, different than the adhesive, over the adhesive applied over the welded areas of the second liner.

7. The method of claim 1,
wherein, the adhesive applied to the welded areas of the external wrapper is one or more of: a silicone adhesive, a polyurethane adhesive, an epoxy adhesive, or an acrylic adhesive; and
wherein, the adhesive applied to the welded areas of the first liner is one or more of: a silicone adhesive, a polyurethane adhesive, an epoxy adhesive, or an acrylic adhesive.

8. The method of claim 2,
wherein, the adhesive applied to the welded areas of the external wrapper is one or more of: a silicone adhesive, a polyurethane adhesive, an epoxy adhesive, or an acrylic adhesive;
wherein, the adhesive applied to the welded areas of the first liner is one or more of: a silicone adhesive, a polyurethane adhesive, an epoxy adhesive, or an acrylic adhesive; and
wherein, the adhesive applied to the welded areas of the second liner is one or more of: a silicone adhesive, a polyurethane adhesive, an epoxy adhesive, or an acrylic adhesive.

9. A vacuum insulated cabinet for a refrigerator comprising:
an external wrapper forming an interior, the external wrapper comprising sheet metal including welded areas, the welded areas having an outboard-facing side and an inboard-facing side, and an adhesive covering at least one of the outboard-facing side and the inboard-facing side of the welded areas;
a first liner disposed within the interior of the external wrapper, the first liner comprising sheet metal including welded areas, the welded areas having an outboard-facing side and an inboard-facing side, and an adhesive covering at least one of the outboard-facing side and the inboard-facing side of the welded areas;
a space between the first liner and the external wrapper; and
a vacuum insulated core disposed within in the space.

10. The vacuum insulated cabinet of claim 9 further comprising:
a second liner disposed in the interior of the external wrapper, the second liner comprising sheet metal including welded areas, the welded areas having an outboard-facing side and an inboard-facing side, and an adhesive covering at least one of the outboard-facing side and the inboard-facing side of the welded areas;
wherein, space is additionally between the second liner and the external wrapper, and between the first liner and the second liner.

11. The vacuum insulated cabinet of claim 9,
wherein, the adhesive covers at least the outboard-facing side of the welded areas of the external wrapper; and
wherein, the adhesive covers at least the inboard-facing side of the welded areas of the first liner.

12. The vacuum insulated cabinet of claim 10,
wherein, the adhesive covers at least the outboard-facing side of the welded areas of the external wrapper;
wherein, the adhesive covers at least the inboard-facing side of the welded areas of the first liner; and
wherein, the adhesive covers at least the inboard-facing side of the welded areas of the second liner.

13. The vacuum insulated cabinet of claim 9,
the external wrapper further including a second adhesive covering the adhesive covering the welded areas of the external wrapper; and
the first liner further including a second adhesive covering the adhesive covering the welded areas of the first liner;
wherein, the second adhesive and the adhesive of the external wrapper are different; and
wherein, the second adhesive and the adhesive of the first liner are different.

14. The vacuum insulated cabinet of claim 10,
the external wrapper further including a second adhesive covering the adhesive covering the welded areas of the external wrapper;
the first liner further including a second adhesive covering the adhesive covering the welded areas of the first liner; and
the second liner further including a second adhesive covering the adhesive covering the welded areas of the second liner;
wherein, the second adhesive and the adhesive of the external wrapper are different;
wherein, the second adhesive and the adhesive of the first liner are different; and
wherein, the second adhesive and the adhesive of the second liner are different.

15. The vacuum insulated cabinet of claim 9,
wherein, the adhesive covering the welded areas of the external wrapper has a thickness of between 0.05 inches and 1.5 inches; and
wherein, the adhesive covering the welded areas of the first liner has a thickness of between 0.05 inches and 1.5 inches.

16. The vacuum insulated cabinet of claim 10,
wherein, the adhesive covering the welded areas of the external wrapper has a thickness of between 0.05 inches and 1.5 inches;
wherein, the adhesive covering the welded areas of the first liner has a thickness of between 0.05 inches and 1.5 inches; and wherein, the adhesive covering the welded areas of the second liner has a thickness of between 0.05 inches and 1.5 inches.

17. The vacuum insulated cabinet of claim 9,
wherein, the adhesive covering the welded areas of the external wrapper is one or more of: a silicone adhesive, a polyurethane adhesive, an epoxy adhesive, or an acrylic adhesive; and
wherein, the adhesive covering the welded areas of the first liner is one or more of: a silicone adhesive, a polyurethane adhesive, an epoxy adhesive, or an acrylic adhesive.

18. The vacuum insulated cabinet of claim 10,
wherein, the adhesive covering the welded areas of the external wrapper is one or more of: a silicone adhesive, a polyurethane adhesive, an epoxy adhesive, or an acrylic adhesive;
wherein, the adhesive covering the welded areas of the first liner is one or more of: a silicone adhesive, a polyurethane adhesive, an epoxy adhesive, or an acrylic adhesive; and
wherein, the adhesive covering the welded areas of the second liner is one or more of: a silicone adhesive, a polyurethane adhesive, an epoxy adhesive, or an acrylic adhesive.

19. A vacuum insulated cabinet for a refrigerator comprising:
  an inner liner forming a food compartment, the inner liner comprising (i) bent sheet metal with edges welded together at welded areas and (ii) adhesive covering the welded areas;
  an external wrapper partially enclosing the inner liner, the external wrapper comprising (i) bent sheet metal with edges welded together at welded areas and (ii) adhesive covering the welded areas; and
  a space separating the inner liner and the external wrapper that is maintained at a reduced pressure relative to pressure outside of the vacuum insulated cabinet.

20. The vacuum insulated cabinet of claim 19, wherein
  the adhesive covering the welded areas of the inner liner covers at least a side of the welded areas facing toward an interior of the inner liner and away from the space separating the inner liner and the external wrapper; and
  the adhesive covering the welded areas of the external wrapper covers at least a side of the welded areas facing outward away from the space separating the inner liner and the external wrapper.

\* \* \* \* \*